United States Patent Office 3,773,877
Patented Nov. 20, 1973

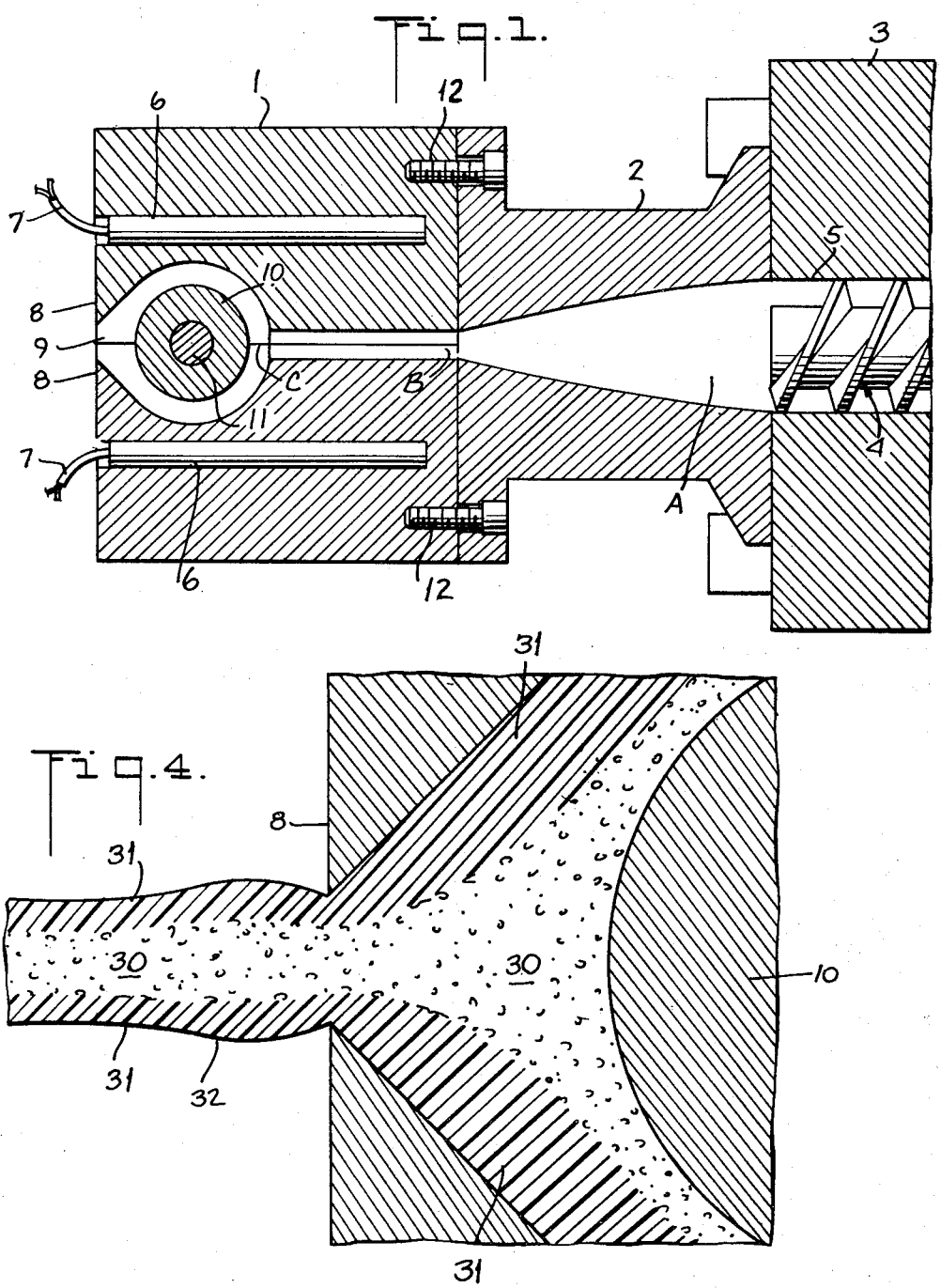

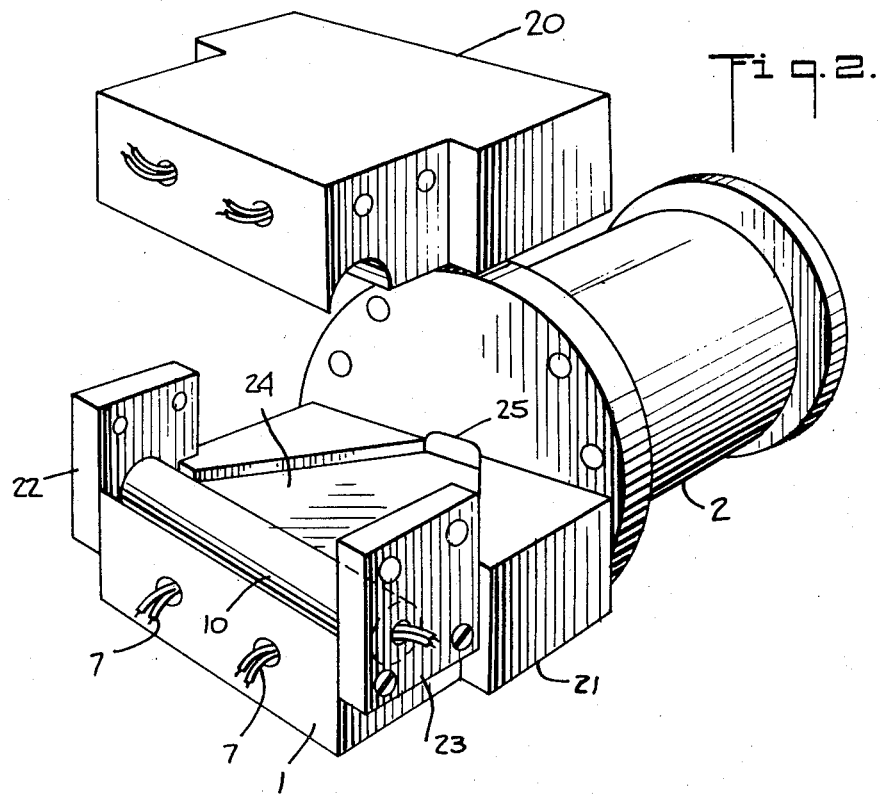
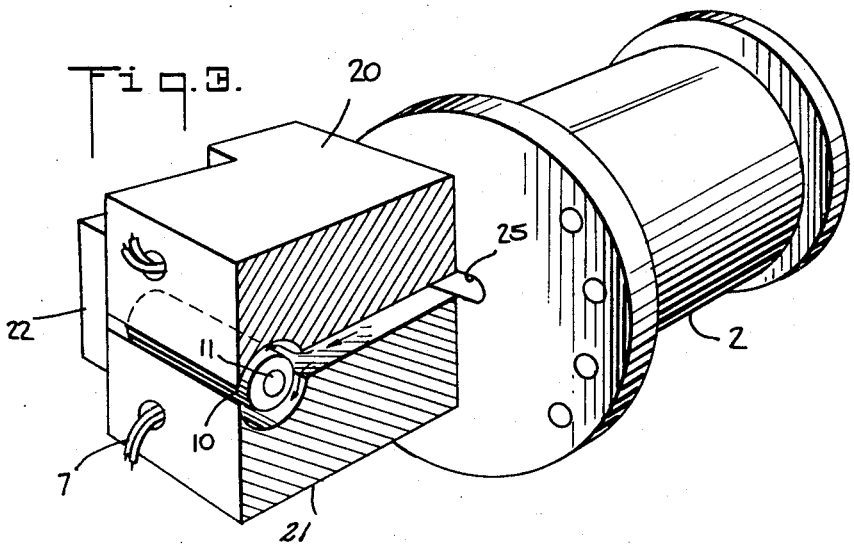

3,773,877
METHOD FOR EXTRUSION OF CELLULAR-CORE INTEGRAL-SKIN PLASTICS
Robert F. Baker and Ebon P. Weaver, Naugatuck, Conn., assignors to Uniroyal, Inc., New York, N.Y.
Original application July 15, 1969, Ser. No. 841,900, now Patent No. 3,608,145, dated Sept. 28, 1971. Divided and this application Apr. 19, 1971, Ser. No. 135,046
Int. Cl. B29d 23/04, 27/00
U.S. Cl. 264—48
2 Claims

ABSTRACT OF THE DISCLOSURE

A die and method for plastic extrusion are disclosed herein in which a heater element within the die is maintained at a temperature above the decomposition temperature of a blowing agent incorporated in a plastic melt to be extruded, and the body and exit orifice of the die are maintained at a temperature below the decomposition temperature of the blowing agent.

CROSS-REFERENCE TO RELATED APPLICATION

This application is a dvision of our prior and copending application Ser. No. 841,900, filed July 15, 1969, now U.S. Patent 3,608,145 issued Sept. 28, 1971.

This invention relates to the extrusion of plastic sheets, pipes, rods and other related articles.

The invention more specifically deals with the production of such articles having cellular cores and smooth surfaces.

BACKGROUND OF THE INVENTION

The process of extruding cellular theromplastics conventionally utilizes a gas which is thoroughly mixed or incorporated within a plastic melt. The gas may be incorporated directly into the melt or it may be derived from a volatile liquid similarly admixed. A blowing agent may also be included on or in the plastic prior to processing. A blowing agent is defined as a substance or substances which will decompose or react under the influence of heat in such a manner as to form a gas. A plastic melt in which a blowing agent has decomposed is known as a blown plastic melt.

The conventional extrusion operation usually involves the use of an extruder in which the plastic melt is propelled into an extrusion die which is attached thereto. The extrusion die has an exit orifice from which the plastic melt is extruded in the form of pipes, sheets or other shapes as desired.

In prior art apparatus, the plastic melt is blown within the extruder or within the extrusion die by adding and mixing a gas or volatile liquid or causing a blowing agent to decompose. The thermoplastic thus formed has a rough surface due to the complete decomposition or other change of the blowing agent throughout the mass and the resulting dispersion of gas throughout. This rough surface is in many cases undesirable. Although prior art methods are available to produce a smooth surface on cellular thermoplastic material, they usually involve treatment of the cellular thermoplastic melt after it exists the extrusion die, requiring additional space and equipment and therefore greater expense.

It is therefore an object of this invention to provide novel apparatus and methods for producing cellular thermoplastic material having smooth surfaces.

It is a further object of this invention to produce directly from the extrusion die a cellular thermoplastic having smooth surfaces.

It is another object of this invention to provide a relatively simple and inexpensive yet throuoghly effective extrusion die for producing cellular thermoplastics having smooth surfaces.

It is another object of this invention to provide a novel process consisting of a minimum number of steps for producing cellular thermoplastic material having smooth surfaces.

Still further objects and the entire scope of applicability of the invention will become apparent from the detailed description given hereinafter; it should be understood, however, that the detailed description and specific embodiment shown are given by way of illustration only, since various changes and modifications within the spirit and scope of the invention will become apparent to those skilled in the art from this detailed description and the following drawings.

SUMMARY OF THE INVENTION

The present inventors have now found that, by control of the various internal temperatures of the thermoplastic melt within the extrusion die and by careful design of the die itself, a thermoplastic can be extruded directly from the die having a desired smooth surface and cellular core.

According to the invention an unblown plastic melt having a blowing agent incorporated therein is fed into an extrusion die in which a heater element resides. The heater element is maintained at a temperature above the decomposition temperature of the blowing agent. Thus, the plastic melt near the heater will become cellular or gas expanded as a result of the decomposition of the blowing agent. The die body on the other hand is maintained at a temperature below the decomposition temperature of the blowing agent. Thus the blowing agent in the plastic melt away from the heater element will not be permitted to decompose and such plastic melt will remain non-cellular or unblown. As the heater element is located within the flow of plastic melt the core or inside of the extrudate produced from the die will be cellular or blown. The external surface of the extrudate will consist of the plastic melt which was not in proximity to the heater, and will be unblown, and thus give the extrudate the desired smooth non-cellular surface.

DRAWINGS

FIG. 1 is a sectional view of the assembled apparatus according to the invention.

FIG. 2 is a perspective view of the assembled extrusion apparatus with the upper forward half of the die elevated.

FIG. 3 is a similar perspective view showing the extrusion die with its forward side half broken away.

FIG. 4 is a fragmentary sectional view of the area around the extrusion die exit orifice including a representation of the plastic melt.

DETAILED DESCRIPTION

Referring specifically to FIG. 1, an extrusion die 1 is shown attached to an extruder 3 by means of an adapter member 2. Worm screw means 4 is used to forward the melt through extruder duct 5. The velocity of the melt through the apparatus may be controlled by the speed of revolution of the worm screw means 4. The temperature of the die is controlled by means of cartridge type heaters 6, electrically controllable by means of conductors 7 connected to external electrical sources. It is apparent that other heating means may be utilized; as for example heat transfer fluids.

The plastic melt enters the adapter member 2 at A. At B the melt enters the die 1, where it passes into a cavity C containing a transversely disposed cylinder 10 with a heater element 11 contained therein. The plastic melt is finally extruded from exit orifice 9. Lips 8 at the exit orifice control the form and volume of the extrudate.

The lips are preferably formed with sharp terminal edges, as shown, to prevent excessive drag at the point of exit. The temperature of cylinder 10 is maintained above the decomposition temperature of the blowing agent incorporated in the plastic melt. The die body 1 and its lips 8 are maintained at a temperature below the decomposition temperature of the blowing agent.

The die 1 may be fastened to the adapter member 2 by conventional means, for example, bolts 12.

FIG. 2 shows the die 1 with its upper and lower halves 20 and 21 separated. Opening 25 of adapter member 2 passes the melt into duct 24 and on around the cylinder 10. Die end plates 22 and 23 may also contain heater elements if desired.

In FIG. 3, the flow of plastic melt is shown by directional arrows from opening 25 around heated cylinder 10. Upper and lower halves 20, 21 of the die are shown sectionalized.

FIG. 4 shows graphically what occurs as the melt is extruded. Cylinder 10 is maintained above the decomposition temperature of the incorporated blowing agent. As a result, the blowing agent in the melt flowing around the cylinder is caused to decompose and form tiny gas-pockets within the melt. The area of blown melt is shown as 30. On the other hand that portion of the melt passing near the body and lips 8 of the die is maintained at a temperature below the decomposition temperature. This results in an unblown portion of the melt shown as 31. Upon extrusion, the extrudate 32 will have a cellular core 30 and a smooth unblown skin 31.

It is noted that the skin thickness is greatly exaggerated for illustrative purposes. Actually, the skin thickness may be almost imperceptible, with the cellular core extending virtually to the surface. Of course, the thickness can be varied as desired as will be described below.

One example of the invention utilizes a Davis Standard Extruder with a 2½ inch diameter bore, and a bore length of 5 feet. The die lips have a 6-inch width and ⅛ inch opening. With this apparatus a rod-shaped heater element having a 1½ inch diameter is loacted within the die in a cavity having a 3½ inch cross-section. The axis of the heater element is approximately at the geometric center of the cavity. A one inch diameter rod has been also used successfully in the same die.

In one test with the above die and extruder, a blowing agent that decomposed at a temperature of between 360° and 380° F. was used. The measured temperature of the heater rod during the process was 400° F. and that of the die body was 330° F. The worm screw of the extruder revolved at 30 r.p.m. for this test. The result was a cellular core thermoplastic with a smooth skin.

As the plastic melt exits the extrusion die it will consist of two contiguous portions of plastic melt. The first or central portion will be cellular due to the decomposition of the blowing agent and the resulting diffusion of gas. The second or outer portion of plastic melt will remain to a great degree in a non-cellular or unblown state and envelop the first portion.

The effect then is to have a plastic article extruded from the extrusion die having a cellular core and a smooth unblown outer portion or skin. By proper adjustment of the apparatus the cellular core may extend virtually to the surface giving a very thin smooth skin if desired.

The thickness of the outer smooth, i.e., substantially unblown surface can be adjusted by control of the velocity of the plastic melt passing through the apparatus. This velocity is controlled conventionally by means of the worm gear in the duct of the extruder. The faster the worm gear revolves, the higher the velocity of the plastic melt. The slower the plastic melt passes through the extrusion die the longer it will remain in proximity to the heater element and the more extensively will the blowing agent decompose throughout the plastic melt. If for example the melt were moving slowly enough, virtually all the melt would be blown.

Control over the extrudate may be maintained by a number of adjustments to the apparatus. For example, the space between the heater element and the exit orifice can be adjusted. Such an adjustment can control the temperature relationships between the die body near the exit orifice and the heater element. The greater the distance the easier it is to maintain a temperature differential. Another factor helping to maintain such a differential is the natural heat insulating qualities of the melt that has been blown by its proximity to the heater element. This insulating quality prevents excessive heat transfer to the cooler unblown melt in the vicinity of the die body and exit orifice.

It may be desired to have the skin on one side of the extrudate thicker than the skin on the other side. This can be acomplished by placing the heater element closer to one half of the exit orifice than the other, or by separately varying the temperature of each section of the exit orifice by means of heating elements.

Upon exit from the die, the extrudate can be handled by conventional equipment.

Examples of suitable blowing agents

| Chemical name: | Decomposition temp. ° F. |
| --- | --- |
| Benzene sulfonyl hydrazide | 300–320 |
| Azodicarbonamide | 330–425 |
| p-Toluene sulfonyl semicarbazide | 435–500 |

It is apparent that other well-known commercial blowing agents than those mentioned above may be used provided they have a decomposition temperature high enough to remain undecomposed in a plastic melt processable by extrusion. The exact decomposition temperature range of the above blowing agents will depend on the specific thermoplastic material used with each agent. Two such thermoplastic materials which we have used successfully are acrylonitrile-butadiene-styrene polymers (commonly referred to as "ABS" resins) and polyvinyl chloride. The invention is not limited to the use of particular thermoplastic materials and virtually all of the well-known thermoplastic materials can be used for the purposes of this invention. Different thermoplastic materials may be mixed in varying proportions according to the physical properties desired.

In practicing our invention we almost invariably use so-called chemical blowing agents, that is, chemical compounds which can be dispersed uniformly throughout the thermoplastic material and which decompose chemically, upon being heated to a sufficiently elevated temperature, to liberate a gas which gives the thermoplastic material its cellular form. Normally the cells formed by generation of the gas are "closed," i.e., non-intercommunicating, or substantially so.

While we have shown a transverse heating element which is cylindrical in cross-section we could use one having any other suitable cross-section, for example, one having a streamlined cross-section.

In practicing our invention we often make a sheet as a product, accomplishing this in the manner portrayed in the drawings by propelling the plastic melt leaving the adapter member 2 with the cross-section of opening 25 and causing it to gradually assume a sheet-like form of ever-increasing width relative to its depth as it moves forward in duct 24 so that by the time it makes contact with transverse heater element 10 it is manifested as a sheet as wide as the extruded sheet 32. The plastic melt then splits, enveloping heater 10, and thereafter is merged as shown in FIG. 4 to again form a sheet-like mass having a considerably larger volume than before due to the expansion. This last mass is then extruded between lips 8 to give the final sheet product 32.

As will be apparent from the foregoing specification, the apparatus and method of the present invention are susceptible of being embodied with various alterations and modifications which may differ particularly from those that have been described in the preceding specification and description. For this reason, our disclosure is intended to be merely illustrative and is not to be construed or interpreted as being restrictive or otherwise limiting of the present invention, except as it is set forth and defined in the hereto appended claims.

The terms "thermoplastic material" and "chemical blowing agent," as used herein and in the claims, have their commonly accepted meanings in the plastics art.

We claim:

1. A method of making a plastic extrusion having a gas-expanded cellular core portion and integral non-expanded skin portions on each side of said core portion which comprises continuously forcing a plastic melt comprising a thermoplastic material and a chemical blowing agent in undecomposed form incorporated therewith into an extrusion die zone and thence through said zone, wherein said plastic melt is caused to assume a sheet-like form as it passes through said zone, said sheet-like form being split into two portions which are caused to pass around a source of heat sufficiently intense to activate the blowing agent in parts of said split portions of said melt which are adjacent to said source of heat, and the split portions of said melt are thereafter caused to merge to form an integral mass which is extruded from an exit orifice in the form of a sheet, a rod, or a pipe.

2. The method of claim 1 wherein the integral mass which is extruded from the exit orifice is in the form of a sheet.

References Cited

UNITED STATES PATENTS

| | | | |
|---|---|---|---|
| 3,068,532 | 12/1962 | Higgins | 264—47 |
| 3,410,932 | 11/1968 | Woodson | 264—48 X |
| 3,525,125 | 8/1970 | Berger | 264—48 X |
| 3,558,751 | 1/1971 | Santelli | 264—48 X |
| 3,299,192 | 1/1967 | Lux | 264—48 |
| 3,431,164 | 3/1969 | Gilberd | 264—48 X |

OTHER REFERENCES

Kestler, J.: "Structural foam goes extruded," pp. 106, 107, Modern Plastics, January 1969.

HOSEA E. TAYLOR, Primary Examiner

H. S. COCKERAM, Assistant Examiner

U.S. Cl. X.R.

264—47, Dig. 5

PO-1050
(5/69)

UNITED STATES PATENT OFFICE
CERTIFICATE OF CORRECTION

Patent No. 3,773,877  Dated November 20, 1973

Inventor(s) Robert F. Baker and Ebon P. Weaver

It is certified that error appears in the above-identified patent and that said Letters Patent are hereby corrected as shown below:

Column 1, line 62: "exists" should read -- exits --.

Column 3, line 40: "loacted" should read -- located --.

Signed and sealed this 9th day of July 1974.

(SEAL)
Attest:

McCOY M. GIBSON, JR.
Attesting Officer

C. MARSHALL DANN
Commissioner of Patents